Figure 3:
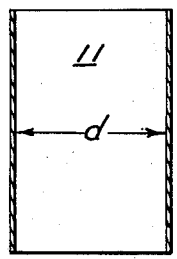

Oct. 28, 1958 W. O. BEYER 2,857,666
MAKING COUPLING ASSEMBLIES
Original Filed Dec. 11, 1950 3 Sheets-Sheet 1
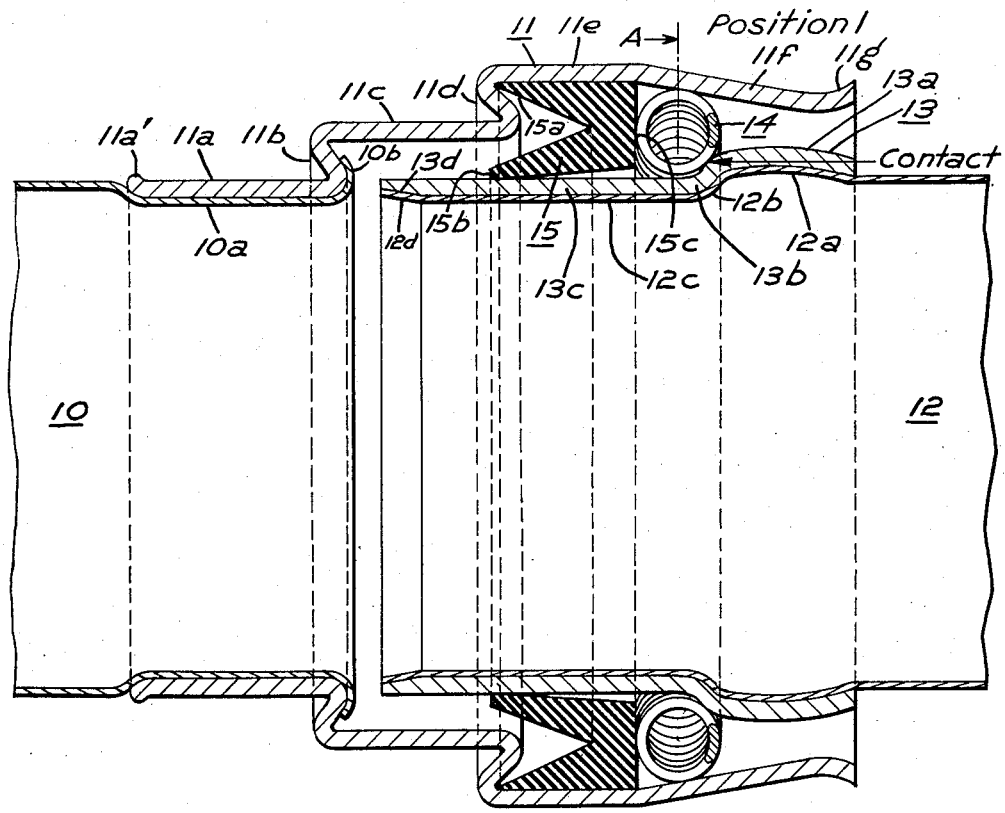
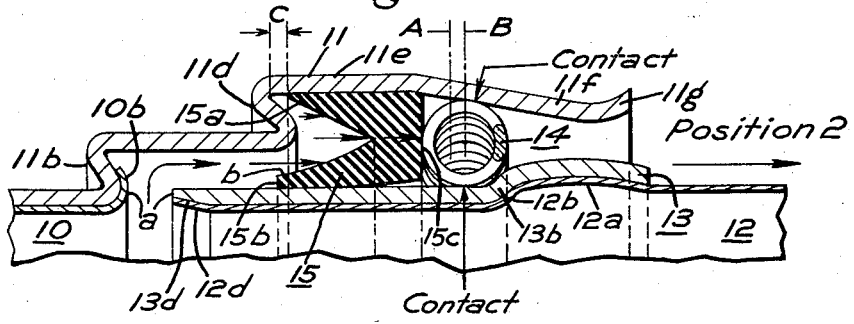
INVENTOR.
Walter O. Beyer
BY Green, McCallister & Miller
his Attorneys.

Oct. 28, 1958 W. O. BEYER 2,857,666
MAKING COUPLING ASSEMBLIES
Original Filed Dec. 11, 1950 3 Sheets-Sheet 2

INVENTOR.
Walter O. Beyer
BY Green, McCallister & Miller
his Attorneys.

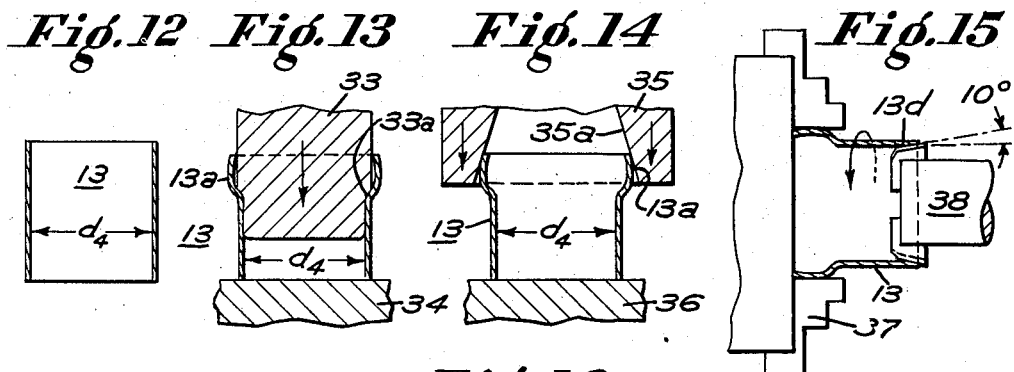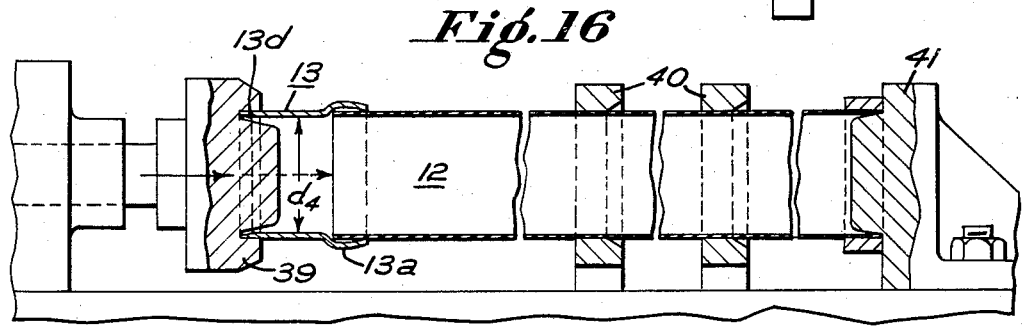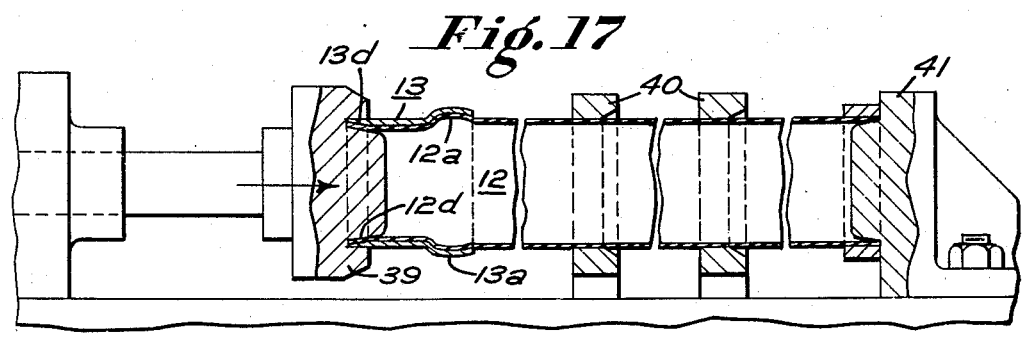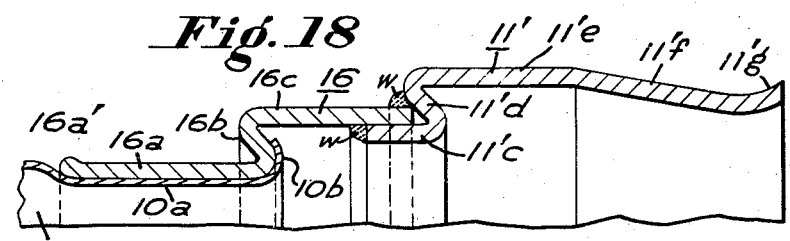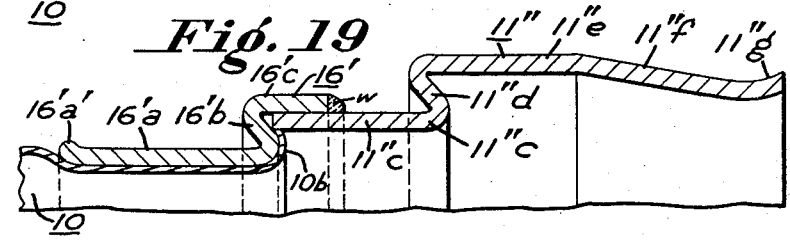

United States Patent Office 2,857,666
Patented Oct. 28, 1958

2,857,666

MAKING COUPLING ASSEMBLIES

Walter O. Beyer, Pittsburgh, Pa.

Original application December 11, 1950, Serial No. 200,191. Divided and this application December 3, 1953, Serial No. 395,991

2 Claims. (Cl. 29—541)

The invention herein involved relates to an improved light weight type of coupling body construction suitable for a self-sealing and self-latching or locking type of fluid coupling and particularly to an improved method of making coupling body parts or portions and of mounting and securing them in position.

This is a division of my application Serial No. 200,191 of December 11, 1950, now Patent No. 2,693,378, and entitled "Quick Release Coupling."

In my above-entitled parent application, I have prosecuted claims to a novel type of quick release coupling and in the present application I am dealing with the construction of housing and tube end body parts of such a coupling, such that relatively light weight tubing, pipe or conduit may be employed in a portable pipe line system, such that a full throat area of fluid flow may be accomplished through the coupling, such that nose and housing body parts or portions of the coupling may be formed or shaped in an improved manner and effectively secured in position on end portions of pipe or tubing members, such that the nose part may be constructed to both reinforce and provide an operating shoulder for the end portion of one conduit member, and such that the housing part may be securely mounted on an end portion of another conduit member and constructed with stepped portions to define a dirt and silt washing out and gasketing receiving offset portion and define an operating surface portion for a latching element.

It has thus been an object of my present invention to devise procedure for making a new and improved coupling body construction for a fluid coupling;

Another object has been to devise and provide an improved method of making and assembling coupling parts and in a simplified and inexpensive manner; and A further object has been to provide an improved method of making coupling body parts and portions and of mounting or securing them in position.

Figure 8:
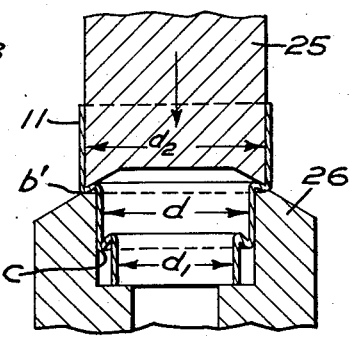
Figure 9:
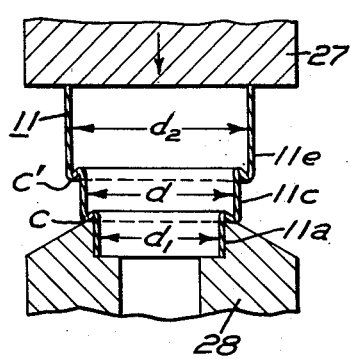
Figure 10:
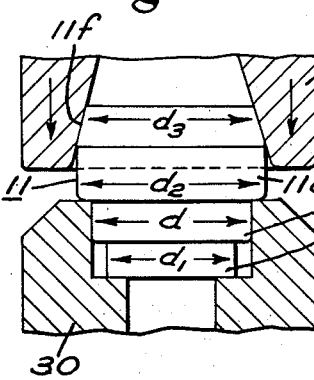
Figure 11:
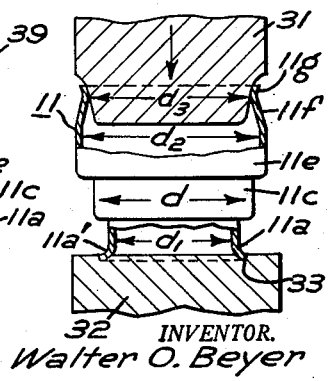

In the drawings, Figure 1 is a longitudinal sectional In the drawings:

Figure 1 is a longitudinal sectional view in elevation through a coupling construction of my present invention and is drawn to scale for a so-called four inch diameter pipe line system;

Figure 2 is a fragmental view of an upper portion of the structure of Figure 1, showing the relationship of its operating parts when fluid pressure is being applied and the conduit member is being latched or held in position with respect to the housing body; as contrasted to this figure, Figure 1 shows the relationship of the parts when fluid pressure is released and after the conduit member has been manually pushed further into the housing body to effect a releasing action upon the grip or latching element;

Figures 3 to 9, inclusive, are somewhat diagramatic reduced views in vertical elevation illustrating steps employed in forming one end of the housing body employed in the construction of Figure 1;

Figures 10 and 11 are views of a type similar to Figures 3 to 9 and illustrate steps employed in forming the bell or open front end of the housing body;

Figures 12 to 15, inclusive, are somewhat diagrammatic reduced views illustrating steps employed in forming an operating surface wall part for the conduit member; Figures 16 and 17 illustrate how this operating surface wall part is securely mounted on an end portion of a conduit member; and Figures 18 and 19 are longitudinal sectional details through modified forms of coupling housing bodies that may be employed with the other coupling parts shown in Figure 1.

Referring particularly to Figure 1 of the drawings, I have shown a fluid conduit or pipe member 10 which is secured at its end to a housing body part or member 11 and a second pipe or conduit member 12 which is adapted to fit within the housing body, mount, or mounting body 11 in a spaced relationship with respect thereto and upon which is mechanically secured an operating surface wall or part 13. A coil-like flexible or spring-like grip or locking element or part 14 is operatively carried by the housing body part 11. A self-sealing fluid gasket 15 is positioned on the housing body member 11 in an operative relationship behind the latching element 14 to position it in a gripping or locking relationship when fluid pressure is applied and to seal off fluid flow between the housing body member 11 and the removable conduit member 12.

The operative positioning of the parts of the coupling is such that it will act with full effectivenes to hold the removable conduit member 12 in position when the parts are assembled and fluid pressure is applied, but will easily and quickly release the holding or gripping relationship of the locking element 14 when an abutment shoulder 13b carried by the removable conduit member 12 is given a longitudinal or axial, inward push against the locking element. This causes the locking element 14 to move within a cone-shaped or tapered throat 11f of the housing body 11 towards its diverging end from position B to position A, see Figures 1 and 2. At the same time, the gasket 15 moves axially-backwardly on a larger throat (cylindrical) diameter 11e. This movement releases compressive force on the outer diameter of the locking element 14 and permits it to expand to the enlarged diameter of the operating surface portion 11f and away from the cylindrical operating surface 13c of the part 13, see Figure 1. The diameter of the expansible and contractible latching element 14 is such that, at this time, it will be slightly less than the diameter of the operating spacing defined between the operating surface of the housing body member 11 at the point of contact or engagement of the element 14 and the operating surface wall part 13 of the conduit member 12. That is, the element or coil annulus 14 has a normal pre-shaped, flexible, internal diameter that is greater than the outer diameter of the operating surface of the part 13. As a result, the locking element 14 will move or spring away from a holding contacting or locking engagement with the part 13 to release such part and permit the removable fluid conduit member 12 to be pulled axially-outwardly from the housing body 11, without the necessity of tilting its convolutions during such withdrawing action.

In addition to the above, I have provided the housing body part 11 with a pair of longitudinally spaced-apart set-back or connecting shoulders 11b and 11d, the first of which serves to limit the maximum inward positioning of the removable conduit member 12, and the other of which serves to operatively position the sealing gasket 15. The angular relationship of the shoulders is preferably about 30° to 45° with respect to the horizontal (the axial plane of the coupling).

As illustrated in Figure 1, a coupling of my construction is particularly suited for the utilization of relatively thin or light-wall conduit members 10 and 12, such as of steel, aluminum or its alloys. The conduit member 10 has an inwardly-offset, cylindrical, secured end portion 10a which fits within a cylindrical, back end portion 11a of the housing body. The inner end 10b of the conduit member 10 is somewhat smoothly bent upwardly around the first re-entrant shoulder 11b and extends backwardly a short distance along its inner, sloped wall; this provides a rim lock for the conduit 10. A simple but highly strong and secure mechanical connection of a permanent type is thus provided between the conduit member 10 and the housing body part 11.

An intermediate, cylindrical portion 11c of the housing body is integral with and extends forwardly of the first shoulder 11b (shown as re-entrant) and has an internal diameter that is radially-outwardly offset with respect to (larger than the diameter of) the cylindrical end portion 11a. The front end of the second or intermediate portion 11c is integrally connected to the second shoulder 11d (also shown as re-entrant). A front, cylindrical portion 11e extends forwardly from the shoulder 11d and cylindrical portion 11c. It is thus seen that the cylindrical portions 11a, 11c and 11e have a stepped-up or outward relationship with respect to each other towards the front end of the housing body 11.

A tapered or cone-shaped throat portion 11f extends forwardly of the cylindrical portion 11e and terminates at its end in a bent-out or bell-shaped flange or mouth portion 11g. As far as the operation of the housing body 11 of the coupling is concerned, the cyindrical portion 11e and the cone-shaped converging portion 11f provide an operating surface wall which has two types of operating surfaces. The operating surface 11e carries the gasket 15 while the operating surface 11f carries the latching element 14 and is adapted to receive and force the latching element inwardly into engagement with the cylindrical portion 13c of the operating surface wall 13 when fluid pressure is applied.

The removable conduit member 12 is shown as having an outwardly offset or bulged, rounded, annular shoulder 12a at a spaced location with respect to its inner end 12d. The shoulder 12a is connected by a curved abutment 12b to an inwardly offset, cylindrical portion 12c. The cylindrical portion 12c as shown, has an internal, outwardly-flared, cone-shaped rim lip end 12d.

The operating surface wall part 13 which also serves to reinforce the connecting end portion of the removable conduit 12, has corresponding portions 13a, 13b, 13c and 13d which mechanically grip like portions of the conduit member 12. The rounded, outwardly offset, shoulder portion 13a and the abutment portion 13b securely grip the corresponding portions 12a and 12b of the conduit member and the inner, outwardly-diverging, cone-shaped rim lip 13d engages the outwardly-flared rim lip 12d of the conduit member, in such a manner that the wall part 13 provides a reinforcing sleeve for the connecting or operating end of the fluid conduit member 12.

As shown in Figure 1, the gasket 15 has an outer side wall portion 15a extending forwardly from its relatively thin feather edge or outer sealing lip and backwardly from its pressure heel 15c. It also has a relatively blunt sealing lip on its opposed, inner side wall portion 15b that extends backwardly from the pressure heel 15c and slightly beyond the upper or outer feather lip edge. The opposite side wall portions 15a and 15b define a V-shaped fluid pressure chamber.

The normal pre-shaped diameter of the gasket 15 is such that its side wall portion 15a is compressed inwardly when it is carried in a mounted position within the housing body 11 and in an operative position with respect to the conduit member 12. As a result, the outer side wall portion 15a of the gasket is in compressive abutment with the cylindrical portion 11e of the housing body member when the gasket is positioned or carried in an operative relationship thereby. The inner side wall portion 15b of the gasket, on the other hand, has a somewhat loose, abutting contact with the operating wall part 13 of the conduit member 12. For best results, I have found that a gasket of somewhat medium hardness is the best, since a soft gasket does not have sufficient stiffness to provide a complete seal and a very hard gasket does not cling enough. Thus, a gasket having an index of about 60 to 65 is preferred.

Figure 1 illustrates the preliminary positioning of the parts of the coupling after they have been assembled and before fluid pressure has been applied. That is, the conduit member 12 can be pushed inwardly through the front throat or mouth end of the housing body member 11 until its abutment portion 13b strikes the locking or grip element 14. At this time, the pressure heel 15c of the gasket is in abutment with the rear side of the locking element 14 and its outer feather edge almost reaches the full inner extent of the re-entrant recess provided by the housing shoulder 11d. Although the inner side wall portion 15b is in abutment with the wall part 13, it is a relatively loose abutment, as explained above, due to the fact that its side wall portion 15b has a diameter of increasing divergence (slopes outwardly) towards the heel portion 15c and with respect to the wall part 13.

It will be noted that the re-entrant shoulder portion 11b forms a positive, maximum, limit stop for the entrant end of the conduit member 12, even where the conduit member is pushed into position with a great deal of force and the locking element 14, by reason of its flexibility, permits the conduit member to go inwardly beyond the position of Figure 1. When such introducing force is released, however, the flexibility of the locking element 14 is sufficient to return the inner end of the conduit member 12 to the desired spaced relationship with respect to the shoulder 11b, as illustrated in Figure 1. At this time, the locking element 14 is being carried by the diverging end portion of the operating surface wall 11f of the housing body member, adjacent the cylindrical portion 11e and the inner diameter of the grip element 14 is out of engagement with the cylindrical operating surface portion 13c of the wall part 13. As a result, minimum friction is encountered in introducing the conduit member 12 into and removing it from the housing body member 11.

As shown in Figure 2, fluid passageways a and b are provided to the chamber of the gasket 15. When, as shown in Figure 2, positive fluid pressure is applied, the chamber of the gasket 15 tends to expand and force its inner and outer lips into tight sealing engagement with the two parts 11 and 13, to advance the gasket slightly forwardly (see space c of Figure 2), so that its pressure heel 15c advances the locking element 14 along and towards the converging end of the cone-shaped or converging operating surface portion 11f of the housing body member or the diametrical center line of the element 14 moves from A to B. At the same time, such fluid pressure which is exerted in a longitudinal-axial direction, tends to cause the removable conduit member 12 and its part 13 to move slightly axially-outwardly, until the major vertical (radial) axis of the locking element 14 is in alignment with the cylindrical (operating surface) portion 13c and the element 14 is out of contact with the positioning abutment 13b. This combined movement causes the locking element 14 to slightly contract against its normal flexibility, so that it is in gripping engagement between the portions 11f and 13c. As the fluid pressure increases, these two movements tend to increase, so that the gripping action will increase correspondingly, thus providing a positive locking relationship between the housing member 11 and removable conduit member 12.

The spacing a (see Figure 2) between the inner end of the conduit member 12 and the shoulder 11d provides a fluid passageway for fluid applied to the chamber defined by the gasket 15. The re-entrant or backwardly offset angles defined by the shoulder portions 11b and 11d causes a full swirling action of the pressure fluid which offsets any tendency for sludge, etc., to form at the base of such shoulder portions and particularly, between the wall portion 11e and the outer side wall portion 15a of the gasket. The gradual backward slope of the shoulder 11b, as contrasted to a normal, right angular slope of prior constructions prevents the deposition of sludge, sand and dirt particles and permits them to be washed out before they tend to adhere to the inner wall portion 11e of the housing body member 11. As shown in Figure 1, the shoulder 11d also serves to retain the gasket 15 within the housing body 11 when the conduit member 12 is being inserted and removed, and when suction or negative pressure force may be exerted.

When fluid is released and it is desired to remove the conduit 12 from the housing body 11, an inward, longitudinal-axial push is preliminarily imparted to the conduit member 12, so that its abutment portion 13b again engages the locking element 14 and pushes the element 14 back from the position of Figure 2 to the starting position of Figure 1. This starting position, as shown in Figure 1, provides a released relationship between the locking element 14 and the conduit member 12 or its part 13. As a result, after the released position has been effected, the conduit 12 may be easily withdrawn or pulled out by applying a longitudinal-axial withdrawing force thereto.

Figure 4:
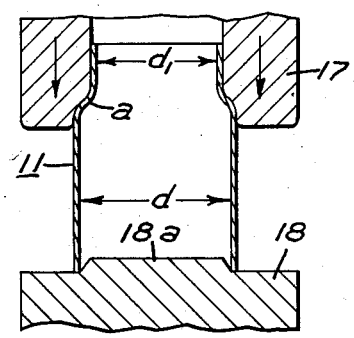

In Figures 3 to 11, inclusive, I have disclosed steps in forming the housing body member 11 of the construction of Figure 1. As shown in Figures 3 and 4, I start with a cylindrical shape having an internal diameter $d$ and then place the shape on a male die 18 having a centrally located positioning abutment 18a and advance a female punch 17 downwardly over the upper end portion of the shape to form a preliminary shoulder $a$ and provide a portion of reduced diameter $d_1$. As a result, the upper end portion (which is to be the portion 11a of the housing body 11) is deformed by circumferentially-externally and axially or endwise applied compressive forces.

Figure 5:
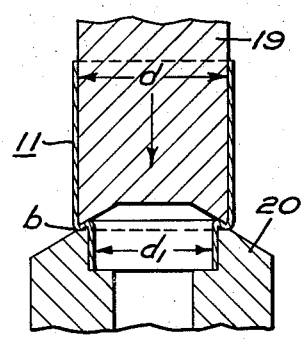

In the next step, as shown in Figure 5, the shape 11 is reversed and its top end is placed in a female die 20 and a punch 19 is advanced through the shape to fold or bend back the shoulder $a$ into a shoulder $b$. This deforming operation is effected by axial or endwise (internally applied) compressive force and produces the beginning of the so-called re-entrant angle. The punch 19 circumferentially-internally supports the portion having the diameter $d$ during this operation.

Figure 6:
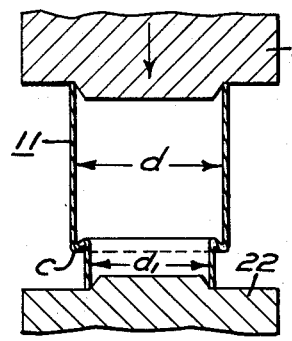

In the next operation, as shown in Figure 6, the blank is retained in the same position as in Figure 5, but is positioned on a lower male die or anvil 22 similar to the die 18 and a punch 21 is moved downwardly to axially compress the shape endwise to finally form the pressure fold or shoulder to its completed reentrant shape $c$ (see 11b of Figure 1).

As shown in Figure 4, the preliminary shoulder $a$ is formed by opposed, endwise-applied forces (exerted by the members 17 and 18) to provide a pair of cylindrical portions $d$ and $d_1$ of different diameters that are connected thereby. In the next operation of Fig. 5, relatively-moving, annular shaping edges (provided by the members 19 and 20, see the circular, projecting, apex edges of such members) are relatively advanced endwise towards each other at the preliminary shoulder $a$. One such annular edge (of member 20) is applied along the outer surface of the smaller cylindrical portion $d_1$, and the other annular edge (of member 19) is applied along an inner surface of the larger cylindrical portion $d$. As a result and, as shown, the preliminary shoulder $a$ is folded into a re-entrant shoulder or shape $b$ which lies between opposed peripheral boundaries of the connected cylindrical portions and, in reality, is a shape having an inner fold connected by a pair of shoulder portions (one inner and one outer). One such shoulder (in Figure 5) lies along, as an extension and within the outer peripheral boundary of the portion $d$ of larger diameter, and the other lies along, as an extension and within the inner peripheral boundary of the portion $d_1$ of smaller diameter. These two spaced shoulder portions that are connected by an inclined portion, when thus formed, have, as shown, a radially-spaced relationship with each other.

Figure 7:
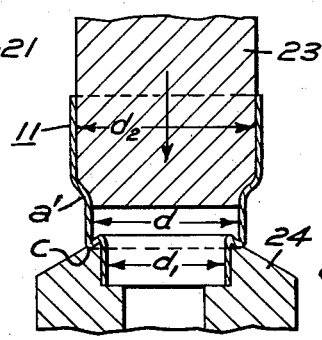

In the next operation, as shown in Figure 7, I introduce the previously formed re-entrant shoulder end of the blank or shape into a female die 24 to support it and then advance a punch 23 internally within the shape to preliminarily form a second shoulder $a'$ and provide an enlarged diameter $d_2$. In this operation, the punch 23 circumferentially expands the other end portion of the blank to a diameter $d_2$ and presses out shoulder $a'$ by axially applied force.

In the next operation of Figure 8, I form the preliminary re-entrant angle shape $b'$ in this new shoulder by means of a female die 26 and a punch 25 in an operation corresponding to that of Figure 5. In Figure 9, an anvil or die 28 (similar to 24 of Figure 7) supports the shape and the shoulder $c$, while a compression punch 27 forces the preliminary shoulder $b'$ further inwardly to form a completed pressure fold or re-entrant shoulder $c'$ (see 11d of Figure 1). The previous working of the shoulder $c$ prevents it from being distorted during these latter operations and particularly, because its base has a smaller diameter $d_1$ (see 11a of Figure 1) than the diameter $d$ (see 11c of Figure 1) of the base of the second shoulder $c'$ and than the diameter $d_2$ (see 11e of Figure 1). It will also be noted that in the operation of Figure 7, the starting diameter $d$ of the shape is enlarged to a diameter $d_2$ in forming the shoulder $a'$. As a result, as shown in Figure 9, the shape now has three diameters.

In Figure 10, I position the shape on a female supporting die 30 and advance a punch head 39 having a cone-shaped internal bore downwardly over the upper portion of the shape to preliminarily form (by circumferential and axial compressive force) its cone-shape operating surface portion (see 11f of Figure 1). In Figure 11, I finally complete the forming of the bell mouth (see 11g of Figure 1) of the housing body 11 by advancing a male punch 31 into its end and flanging or swedging out its edges (by circumferential expansive and axial compressive force). The bell mouth has minimum diameter $d_3$. In this operation, the die 32 produces an outwardly-flared tube or conduit entry flange 11a' at the other end of the part 11. The part 11 of Figure 11 has the ultimate desired shape of the housing body member as employed in the construction of Figure 1.

The conduit member 10 may then be secured on the back end portion 11a of the housing member or mount 11 by introducing the end portion of the conduit 10 into the entry flange 11a' and advancing the two parts relatively with respect to each other under axial or endwise compressive force, in the manner indicated in Figures 16 and 17 for the conduit member 12 and its wall part 13, and then by pushing-up or turning over the flange 10b, see Figure 1. It will also be noted that the normal external diameter of the conduit member 10 is greater than the internal diameter of the mounting portion 11a of the body member 11. That is, the inner diameter of 11a should be sufficiently small that compression is insured on the tube end portion 10a when entered, allowing for tolerances of commercial tubing. In this maner, I provide a secure mechanical joint between the housing body member 11 and the conduit member 10 without welding, etc.

In Figures 12 to 15, inclusive, I have shown steps employed in forming the operating wall part 13 of the removable conduit member 12. In Figures 16 and 17, I have shown steps involved in mounting, assembling and securing the part 13 on its conduit member 12. As an initial step, see Figure 12, a cylindrical or shell-like blank or shape is provided having an internal diameter $d_4$. The cylindrical blank is then positioned on the planar face of a die block or anvil member 34 and a premiliminary shoulder 13a is formed by advancing a punch 33 and its shoulder 33a into position within the upper end of the shape 13. A circumferential expansive and axial compressive force is employed.

In the next step, see Figure 14, the shape is positioned with its lower end on a planar face of an anvil or die block 36 and a swedging-in punch 35 having a cone-shaped bore 35a is advanced over the shoulder 13a, thus turning-in its external edges and finally shaping the bulge or shoulder at its upper end (see 13a of Figure 1). Circumferential and axial (endwise) compressive force is employed. As shown in Figure 15, the shape is then held at its shoulder end by jaws of a lathe chuck 37 and a cutting tool 38 is inserted within the other end. Relative rotation is effected between the parts 37 and 38 to provide an internal cone-shaped beveling off of the rim lip edge of the shape (see 13d of Figure 1). The part 13 is now completed.

In assembling the part 13, as completed by the step of Figure 15, its beveled end is gripped by a head stock 39 (see Figure 16) and the conduit member 12 is mounted to extend longitudinally-axially towards the part 13 on a tail stock or abutment 41. The conduit 12 extends through spaced-apart guide members 40. The operating end of the conduit member 12 is then inserted into the shoulder end of the part 13 and as shown in Figure 17, the head stock 39 may be advanced, for example, by a hydraulic cylinder piston or a motor driven jack screw to slide the part 13 completely over the end of the conduit 12. This also causes the rim lip edge of the conduit 12 to conform to the internal contour of the part 13 at the completion of the pushing (axial compressive) operation, see Figure 17. Since the internal diameter $d_4$ of the part 13 is slightly less than the external diameter of the conduit member 12, for example, 3⅞ inches as compared to 4 inches, it is apparent that the metal tends to flow during the operation of Figures 16 and 17 and a full conformance of shape of the relatively thin wall of the conduit member 12 is effected. As shown, its rim lip edge 12d is mechanically clamped against the rim lip edge 13d of the part 13 and its shoulder 12a is mechanically clamped against the shoulder 13a of the part 13. This provides a highly effective and efficient mechanical method of mounting and securely positioning part 13 on the conduit member 12.

The coupling construction as shown in Figure 1 provides a re-entrant shoulder 11d for retaining the gasket 14 which in effect, screens the outer lip edge of the gasket from direct impingement by sand and other particles and elements that would tend to back up and spoil its capillary seal. It also makes the gasket 14 secure during movement of the removable conduit 12.

It is possible to use relatively thin wall tubing of aluminum or steel and to provide a strong reinforcement of steel, brass, alloy steel or aluminum by the capstan type of holding action which secures the end of the conduit 12 to its reinforcing or protecting part 13 in tension and which secures the conduit 10 to the housing body 11. This type of fit gets tighter with usage of the coupling, as distinguished from a shear type of fit which may tend to work loose.

The protecting or reinforcing part 13 which also serves as an operating surface wall of the coupling, may be a short length, steel tube of four inches outer diameter and one eighth of an inch wall thickness mounted on a four inch outer diameter steel or aluminum tubing. The axial compressive force applied to slide the part 13 on the end of the conduit member 12 produces an extrusion-like flow of the metal of the light wall of the conduit 12, as it moves past the shoulder of the part 13. The unexpanded portion of the part 13 will have the same external diameter as the non-fitted or major wall portion of the conduit member 12. This is of great importance from the standpoint of interchangeability. I have determined that this can be accomplished employing any suitable material such as aluminum or steel for the conduit member 12 which will have an extrusion-like flow (corresponding to these metals) and will be compressible and will take a permanent set without crystalization.

By way of example, the initial axial force or pressure applied to a four inch conduit member 12 may approximate a 500 pound thrust, see Figure 16. However, as the reduced diameter portion of the conduit 12 continues to move into the reinforcing part 13, the thrust pressure required increased rapidity, as at one inch entry, the pressure required is approximately 1000 pounds; at three inch entry, it is approximately 2000 pounds; and at a full length entry of about five inches, it approximated about 3000 pounds. At the latter point, the light wall conduit 12 still had about ¼ of an inch to go into the cone rim lip end of the reinforcing part 13. At this point, see Figure 17, about 5000 pounds pressure was required to bring the remote end of the part 13 and the full length of the conduit member flush at their edges 13d and 12d. The difference in the amount of working pressure required for steel and for aluminum is very slight when using SAE 10–10 steel for the reinforcing part 13 and when using about .20 to .30 carbon steel tubing or 61 ST aluminum tubing for the conduit member 12.

The shoulder 33a of the punch 33 (see Figures 13) employed in forming the reinforcing part 13 inherently curls the expanding metal sharply away from the punch contour at such shoulder. However, as the punch 33 continues to enter, the edge of this curl draws back again on the body of the punch to produce an outwardly curving profile 13a on the expanded portion. The more abrupt the shoulder 33a on the punch, the more pronounced is this curvature. When the light wall conduit member 12 is entered for the depth of the expanded portion 13a of the part 13, the inner wall of such expanded portion will curve outwardly from the exterior surface of the conduit 12 in an arch-like manner. This shoulder, in addition to having a definite utilization in the coupling operation, gives a substantial body resistance to the withdrawal of the end of the conduit member 12 from its reinforcing part 13. The conduit member 12, of course, becomes a column with fixed ends and must be supported as shown, by a series of spaced-apart supports 40 to prevent buckling along its length (see Figures 16 and 17).

It will appear that the removable conduit or tubing member 12 can be easily released from the housing body 11 by a simple push and pull action with little or no turning effort on the conduit member, since the locking or grip element 14 is now in a released position (see the full lines of Figure 1) with respect thereto. The abutment 13b of the shoulder 13a serves as a limit stop for the grip element 14 when the parts are, for example, in the position of Figuree 1; it with the grip element 14 provides a minimum clearance between the inserted end of the conduit or tube member 12 and the inside of the coupling body 11 which insures that hydraulic pressure will have free access in an operative manner to the pressure heel 15c to produce differential pressure and a consequent grip coil action.

Employing the principles of the Beyer at el. Patent No. 2,259,453 as to critical slope angle (1) the opposed operating or gripping surfaces 11f and 13c should have an effective convergence angle (1) of below about 17° as a maximum. If the O. D. (d) of the surface 13c is 4″ and the I. D. (D) of 11e is 5⅛″, the maximum convergence angle (1) is about 12° 45′. By way of example, if 11f has a converging angle of 10° and 13c is horizontal or has no angle or if 11f has a converging angle of 20° and 13c has a diverging angle of 10° (the effective value of (1) thus being 20° less 10° or 10°), in each of these cases the effective value of (1) will be well below the 12° 45' maximum.

In Figure 18, I have shown a modified form of housing body made up of two parts 11' and 16 that are separately formed and secured together by weld metal W to form a complete body that may be used in place of the body 11 of Figure 1. For the part 11', I have used the same numeral with the same alphabtic designators as in Figure 1, but with prime affixes to indicate similar portions; for the part 16, I have used the same alphabetic designators but a different numeral. It will be noted that the parts 11' and 16, each have outwardly-stepped annular wall portions and that the portion 11'c of least diameter of the part 11' is adapteed to fit under or slide into the portion 16c of the other part 16.

In Figure 19, the body construction is somewhat similar to that of Figure 18, except that the portion 11'c is longer than the portion 16'c and is adapted to fit within the re-entrant shoulder 16'b, while in Figure 18, the portion 16c is longer than the portion 11'c and is adapted to fit within the shoulder 11'd and in Figure 18, two welds W are employed. As will be noted, prime affixes to the numeral 16 and double prime affixes to the numeral 11 are employed to indicate portions of the parts 11' and 16' of the embodiment of this figure that correspond to portions of the embodiment of Figure 18.

What I claim is as follows:

1. A method of making a cylindrical wall member of substantially uniform diameter along its length into a member having at least a pair of cylindrical portions of different diameters that are connected together by a re-entrant shoulder portion which comprises: applying peripheral wall-reforming force and forming a cylindrical portion of different diameter than the original diameter of the wall member, while forming a preliminary connecting shoulder between the cylindrical portions of different diameter; relatively moving a pair of complementary inclined annular shaping edges endwise toward each other and against the preliminary shoulder, one along an outer surface of the cylindrical portion of smaller diameter, and the other along an inner surface of the cylindrical portion of larger diameter; and simultaneously bending an inner annular shoulder portion on one of the cylindrical portions and an outer annular shoulder portion on the other cylindrical portion in a radially-spaced and connected relationship with each other, and forming the shoulder portions into a re-entrant shoulder that lies between opposed peripheral boundaries of the connected cylindrical portions.

2. A method of making a coupling assembly comprising the steps of: providing a hollow cylindrically-shaped pipe member of uniform diameter, applying peripheral wall-reforming force and forming a cylindrical portion of different diameter than the original diameter of the cylindrically-shaped pipe member, while simultaneously forming a preliminary connecting shoulder between the cylindrical portions of different diameters; relatively moving a pair of complementary inclined annular shaping edges toward each other and against the preliminary connecting shoulder with one of said shaping edges pressing against the inner surface of said preliminary connecting shoulder and the other of said shaping edges pressing against the outer surface of said shoulder, and simultaneously bending said preliminary connecting shoulder between said complementary inclined shaping edges into a re-entrant shoulder that lies between opposed peripheral boundaries of the connected cylindrical portions on the pipe member; providing a sleeve-like body part of greater wall thickness than said pipe member, forming an annular shoulder in a wall portion of said body part adjacent one end thereof; positioning the other end of said body part against an abutment to project therefrom, forcing an end portion of said pipe member, having an external diameter that is slightly greater than the internal diameter of the wall of said body part, longitudinally-endwise into and along the interior of said body part and against the abutment; and applying endwise compression along the wall of the end portion of the pipe member and against the abutment, while preliminary expanding the end portion radially-outwardly into pipe compression engagement with and along a wall of the body part and conforming an annular band of the end portion with the annular shoulder.

References Cited in the file of this patent

UNITED STATES PATENTS

| | | |
|---|---|---|
| 321,822 | Kind | July 7, 1885 |
| 1,152,858 | Stewart | Sept. 7, 1915 |
| 1,485,555 | Daykin | Mar. 4, 1924 |
| 1,623,059 | Lammine | Apr. 5, 1927 |
| 1,802,538 | Rych | Apr. 28, 1931 |
| 1,901,201 | Taylor | Mar. 14, 1933 |
| 1,971,117 | Mossberg | Aug. 21, 1934 |
| 2,130,699 | Reinartz | Sept. 20, 1938 |
| 2,144,701 | Campbell | Jan. 24, 1939 |
| 2,227,820 | Bratz | Jan. 7, 1941 |
| 2,259,453 | Beyer | Oct. 21, 1941 |
| 2,268,246 | Dooley | Dec. 30, 1941 |
| 2,506,657 | Webster | May 9, 1950 |
| 2,551,484 | Branning | May 1, 1951 |
| 2,637,063 | Becker | May 5, 1953 |
| 2,683,928 | Carson | July 20, 1954 |
| 2,693,378 | Beyer | Nov. 2, 1954 |

UNITED STATES PATENT OFFICE
CERTIFICATE OF CORRECTION

Patent No. 2,857,666                                                    October 28, 1958

Walter O. Beyer

It is hereby certified that error appears in the printed specification of the above numbered patent requiring correction and that the said Letters Patent should read as corrected below.

Column 1, line 52, strike out "In the drawings, Figure 1 is a longitudinal sectional"; column 3, line 7, for "secured" read -- securing --; column 4, line 19, after "gasket" insert -- 15 --.

Signed and sealed this 27th day of January 1959.

(SEAL)
Attest:

KARL H. AXLINE                                           ROBERT C. WATSON
Attesting Officer                                           Commissioner of Patents